Figure 1:
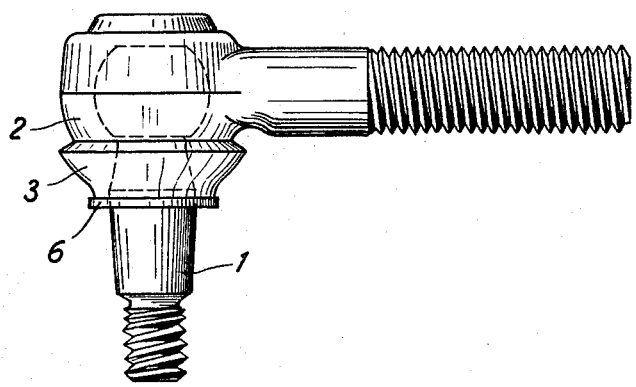

Dec. 13, 1966    V. LANGEN    3,291,511
BALL AND SOCKET JOINTS
Original Filed Jan. 23, 1958

Inventor
VIKTOR LANGEN
BY Robert H. Jacob
AGENT.

3,291,511
BALL AND SOCKET JOINTS
Viktor Langen, Moorerbusch, near Dusseldorf, Germany, assignor to A. Ehrenreich & Cie, Dusseldorf-Oberkassel, Germany
Continuation of application Ser. No. 710,719, Jan. 23, 1958. This application Mar. 25, 1963, Ser. No. 269,835
1 Claim. (Cl. 287—87)

This application is a continuation of my earlier filed application Serial No. 710,719 filed January 23, 1958, and now abandoned.

This invention relates to improvements in and relating to ball and socket joints of the type having a sealing cap of elastic material such as rubber provided on the ball headed stud and extending around the socket casing adjacent the opening therein for the ball headed stud and more particularly to such ball and socket joints for use on the steering links of motor vehicles.

The sealing cap of joints of the above type is charged with a lubricant to ensure the continuous lubrication of the joint, particularly when the joints are designed to be substantially maintenance free.

In the assembly of motor vehicles in motor vehicle factories and in assembly workshops it can happen that the charging of the sealing cap with lubricant is forgotten, which may have unpleasant consequences on driving the vehicle later. In addition the insertion of the lubricant during the assembly of the vehicle is troublesome and time consuming and is also the cause of production line bottlenecks as when inserting the lubricant the ball arm is greased with lubricant which must subsequently be removed so that the arm holds in its bearing boss.

According to the invention the ball headed stud of a ball and socket joint of the type referred to is provided with a ring in contact with the edge of the cap surrounding the stud and secured on the stud to maintain contact between the sealing cap and the socket casing.

The ball and socket joint according to the invention can be charged with lubricant and delivered to the motor vehicle factories or assembly workshops ready for assembly, or can be kept in stock charged with lubricant, thus ensuring that only joints correctly charged are assembled; and the assembly is facilitated.

The ring may be secured on the ball headed stud in any suitable manner; the inner edge may be provided with claws, prongs or projections which are bent down when the ring is pushed over the stud and pressed into the stud when there is any tendency for the ring to slide away from the cap. The ring may, in addition or alternatively, be provided with a locking cover.

Preferably the ring comprises extensible material at least at the inner edge such as a synthetic plastic, e.g. a polyamide or superpolyamide which is oil resistant and capable of gripping the surface of the stud to secure against its inadvertent removal therefrom. Conveniently the ring may be formed of such synthetic plastic with a hollow conic section so that the inner edge diverges toward the sealing cap. The divergence should not be so great that the reaction pressure of the sealing cap is insufficient to constrain the inner edges of the ring to a position substantially parallel and in contact with the surface of the stud.

A lip or flange may be swaged, pressed or moulded at the outer edge of the ring to engage over and grip the edge of the cap surrounding the stud to increase the securing of the cap by the ring and where the inner edges of the ring are convergent to increase the securing of the ring on the study by maintaining the angle of the ring in relation thereto.

The invention will be described with reference to the accompanying drawings in which:
FIGURE 1 shows a ball and socket joint assembled on a lever eye,
FIGURE 2 is a part sectional view of the joint; and
FIGURE 3 is a similar view to FIGURE 2 showing an alternative ring.

The ball and socket joint comprises a ball headed stud 1 on which is formed a ball housed in a socket casing 2. An oil resistant rubber sealing cap 3 is positioned on the tapered stud 1 and extends around the socket casing 2 at its lower edge 4 adjacent the opening for the ball headed stud.

An extensible nylon ring 6 is located on the stud in contact with the lower edge of the sealing cap 3. Preferably the inner edge of the ring diverges toward the sealing cap, when unstrained, but when fitted is in contact with the tapered surface of the stud, thus assisting in securing the ring to the stud and preventing the inadvertent removal of the sealing cap 3 from the edge 4 of the socket casing 2. In use the ring is strained by stretching over the stud and by the reaction of the sealing cap.

Figure 2:
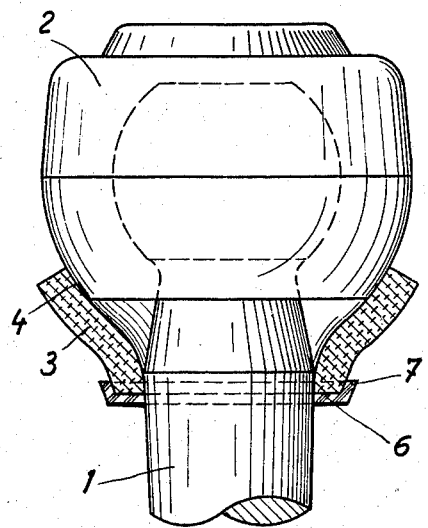
Figure 3:
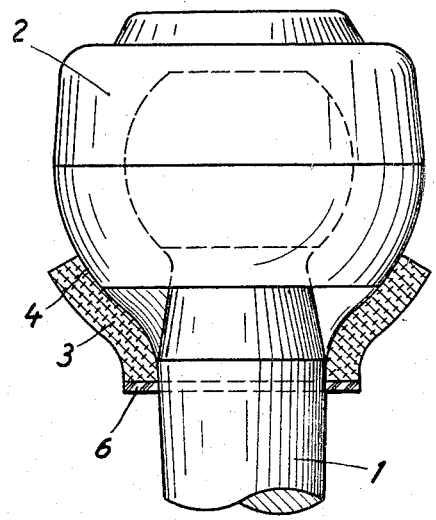

In FIGURES 1 and 2 the ring 6 is formed with an upwardly extending lip 7 which engages over and grips the lower edge of the sealing cap 3. In FIGURE 3 the breadth of the ring is the same as the thickness of the sealing cap and no lip is provided.

The ball and socket joint is charged with lubricant when the sealing cap is fitted: the sealing cap is filled with lubricant and pushed over the stud to seat round the socket casing at the edges 4. The ring 6 is then pushed over the stud against the sealing cap. It will be appreciated that the fitting of the ring 6 substantially removes any lubricant slick on the stud which may be trailed by the lower edge of the sealing cap.

What I claim is:
An unassembled ball and socket unit containing a lubricant prior to assembly in machinery and adapted for assembly in machinery comprising a ball headed stud having a stud portion presenting a ball head in a socket casing, a resilient sealing boot disposed between said socket casing and said stud and extending in intimate sealing engagement around said casing and said stud so as to retain said lubricant within said casing, and a retaining ring disposed endwise of said sealing cap in intimate contact with the proximate outer surfaces of said cap and said stud, said ring being of resilient material and having an unstressed inner diameter sufficiently less than the diameter of said stud to tightly engage the outer surface of said stud and resist movement of said ring along said stud and hold said boot against said casing with the absence of an adjacent linkage member on the stud and thereby retain the boot in lubricant sealing contact with the casing, said retaining ring also being provided with a lip formed around the outer peripheral portion thereof and extending over a peripheral portion of said cap in the direction of said housing to reinforce the contact between said sealing boot and said casing.

References Cited by the Examiner

UNITED STATES PATENTS

| 2,197,037 | 4/1940 | Gardner. |
| 2,686,070 | 8/1954 | Booth. |
| 2,707,645 | 5/1955 | Moskovitz. |
| 2,819,918 | 1/1958 | Seaquist. |
| 2,971,787 | 2/1961 | Lincoln. |
| 2,974,975 | 3/1961 | Thomas. |

THOMAS F. CALLAGHAN, *Primary Examiner.*

CARL W. TOMLIN, *Examiner.*

A. V. KUNDRAT, *Assistant Examiner.*